United States Patent
Cardama Sierra

(10) Patent No.: US 9,531,434 B1
(45) Date of Patent: Dec. 27, 2016

(54) METHOD AND APPARATUS FOR INCREASING NETWORK CONNECTIVITY THROUGH POWER LINE COMMUNICATIONS

(71) Applicant: Marvell International Ltd., Hamilton (BM)

(72) Inventor: Ignacio Cardama Sierra, Paterna (ES)

(73) Assignee: Marvell International Ltd., Hamilton (BM)

( * ) Notice: Subject to any disclaimer, the term of this patent is extended or adjusted under 35 U.S.C. 154(b) by 607 days.

(21) Appl. No.: 14/088,740

(22) Filed: Nov. 25, 2013

Related U.S. Application Data

(60) Provisional application No. 61/731,664, filed on Nov. 30, 2012.

(51) Int. Cl.
*H02J 1/00* (2006.01)
*H02J 3/00* (2006.01)
*H04B 3/54* (2006.01)

(52) U.S. Cl.
CPC .................................... *H04B 3/54* (2013.01)

(58) Field of Classification Search
CPC ..... H04B 3/54; H04B 3/56; H04B 2203/2462; H04B 3/00
USPC ............................................................. 307/1
See application file for complete search history.

(56) References Cited

U.S. PATENT DOCUMENTS

2012/0076186 A1* 3/2012 Sasaki ..................... H04B 3/54
375/222

* cited by examiner

*Primary Examiner* — Carlos Amaya

(57) ABSTRACT

Some of the embodiments of the present disclosure provide an apparatus comprising: a first power line communication module coupled to an electrical power network, wherein the electrical power network is configured to transmit (i) power using alternating current signals that operate at a power-line frequency, and (i) data signals, wherein the first power line communication module is configured to (i) filter the alternating current signals received from the electrical power network, and (ii) output the data signals; and a wireless access point coupled to the first power line communication module, wherein the wireless access point is configured to (i) communicate with a user device via a wireless communication channel, and (ii) communicate, using the data signals via the first power line communication module and the electrical power network, to a second power line communication module coupled to the electrical power network.

20 Claims, 7 Drawing Sheets

METHOD AND APPARATUS FOR INCREASING NETWORK CONNECTIVITY THROUGH POWER LINE COMMUNICATIONS

CROSS REFERENCE TO RELATED APPLICATIONS

This disclosure claims priority to U.S. Provisional Patent Application No. 61/731,664, filed on Nov. 30, 2012, which is incorporated herein by reference.

TECHNICAL FIELD

Embodiments of the present disclosure relate to increasing network connectivity in a house or a building, and more particularly, to method and apparatus for increasing network connectivity through power line communications and wall mounted sockets.

BACKGROUND

A wireless local area network (WLAN) is often used to wirelessly connect a plurality of electronic devices. In some situations, a coverage area of a WLAN may not span an entirety of a house or building. For example, a wireless router providing WLAN connectivity may have a limited coverage area, and such coverage area may not span an entirety of a house or building. In such a situation, it may be desirable to extend the coverage area of a WLAN.

SUMMARY

In various embodiments, the present disclosure provides an apparatus comprising: a first power line communication module coupled to an electrical power network, wherein the electrical power network is configured to transmit (i) power using alternating current signals that operate at a power-line frequency, and (i) data signals, wherein the first power line communication module is configured to (i) filter the alternating current signals received from the electrical power network, and (ii) output the data signals; and a wireless access point coupled to the first power line communication module, wherein the wireless access point is configured to (i) communicate with a user device via a wireless communication channel, and (ii) communicate, using the data signals via the first power line communication module and the electrical power network, to a second power line communication module coupled to the electrical power network, thereby communicatively coupling the user device to the second power line communication module, wherein the apparatus is configured to be mounted on a wall.

In various embodiments, the present disclosure also provides a method comprising: receiving, by a first power line communication module over an electrical power network, (i) alternating current signals that operate at a power-line frequency, and (i) data signals, wherein the first power line communication module is included in an apparatus that is mounted on a wall; filtering, by the first power line communication module, the alternating current signals received from the electrical power network to output the data signals; and communicating, by a wireless access point that is included in the apparatus, with (i) a user device via a wireless communication channel, and (ii) a second power line communication module using the data signals via the first power line communication module and the electrical power network, thereby communicatively coupling the user device to the second power line communication module, wherein the second power line communication module is coupled to the electrical power network.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure.

DETAILED DESCRIPTION

Figure 1:
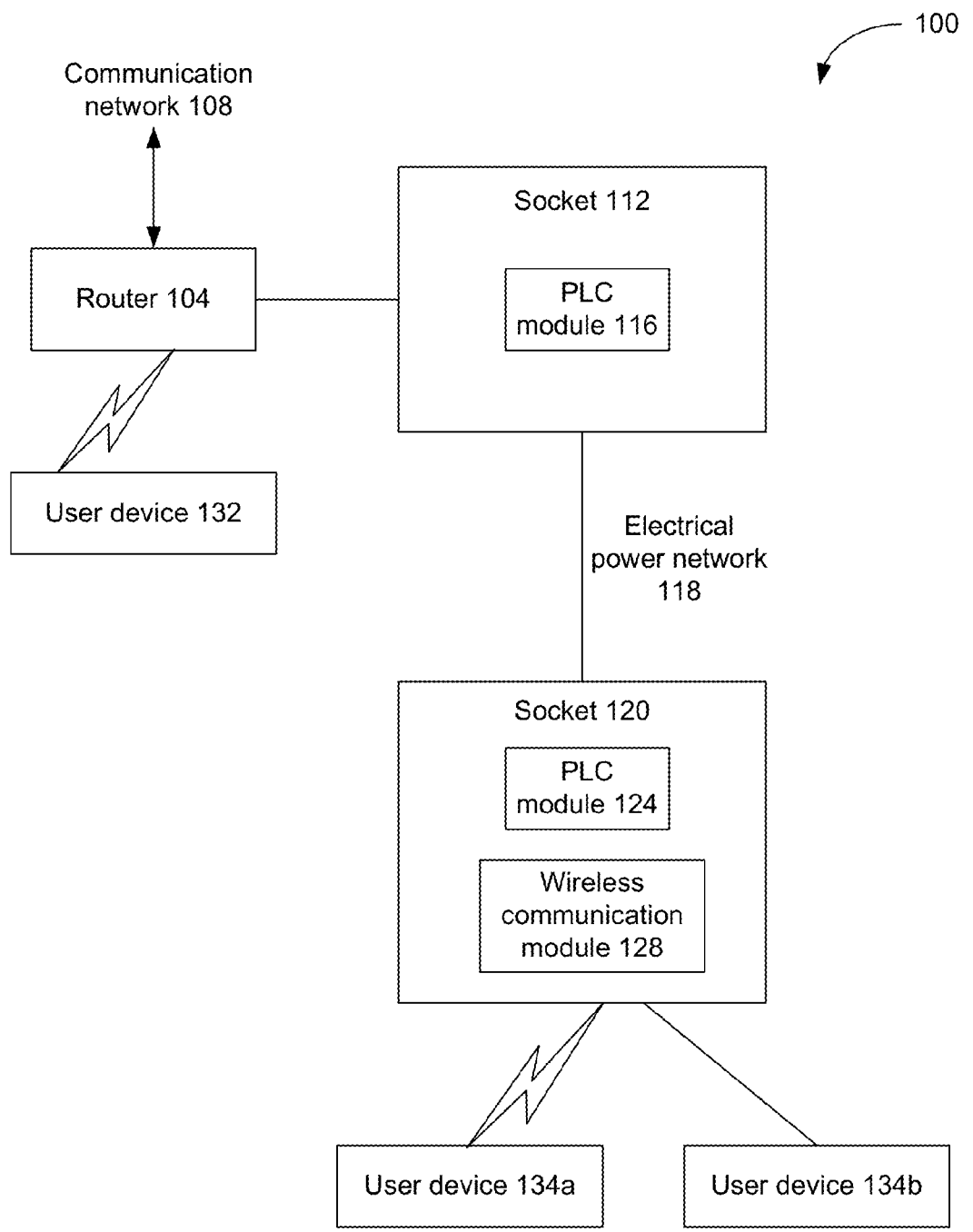
FIG. 1 schematically illustrates one implementation of a system, including a wall mounted socket, for increasing network connectivity through power line communications.

FIG. 1 schematically illustrates one implementation of a system 100, including a wall mounted socket, for increasing network connectivity through power line communications. The system 100 comprises a router 104 communicatively coupled to a communication network 108. In an embodiment, the communication network 108 is any appropriate communication network, e.g., the Internet, a local area network, a wide area network, a wireless communication network, and/or the like. The router 104 is coupled to the communication network 108 (e.g., via an appropriate modem) using, for example, a wireless communication link, a Digital Subscriber Line, a fiber optic line, a cable line, and/or the like.

In an embodiment, the router 104 provides connectivity to various user devices using wireless communication channels (e.g., in accordance with one or more of the Institute of Electrical and Electronic Engineer (IEEE) 802.11 family of standards), Ethernet links, Universal Serial Bus (USB) links, and/or the like. For example, the router 104 is coupled (e.g., via one of a wireless communication channel, an Ethernet link, an USB link, or the like) to a user device 132, and provides the user device 132 access to the communication network 108 (in FIG. 1, the router 104 is illustrated to be coupled to the user device 132 using a wireless communication link, although a wired communication link may also be used to couple the router 104 to the user device 132). In an embodiment, the router 104 is an access point, e.g., a wireless access point. A user device, e.g., the user device 132, may be a consumer electronic device configured to be communicatively coupled to the communication network 108, e.g., a computer, a laptop, a tablet, a smart phone, a mobile phone, a set-top box, or the like.

The system 100 also comprises a socket 112 coupled to the router 104. In an embodiment, the socket 112 is mounted in a wall of, for example, a house or a building. For example, a typical house generally has a number of electrical sockets mounted on walls of various rooms. The socket 112 is a replacement of such an electrical socket mounted in a wall of a room. The socket 112 is mounted in a wall of a room such that the socket 112 is located in close proximity to the router 104. For example, the router 104 may be located in the room that has the socket 112.

In an embodiment, the socket 112 has a power line communication (PLC) module 116 that is coupled to (i) the router 104, and (ii) an electrical power network 118. PLC refers to transmission of data over an electrical power network that is also used simultaneously for alternating current (AC) electric power transmission. The PLC module 116 operates by modulating data signals received from the router 104, and transmitting the modulated data signal via the electrical power network 118 to another PLC enabled device (e.g., from socket 120 of FIG. 1, as will be discussed herein later) coupled to the electrical power network 118. The PLC module 116 also receives modulated data signals from the another PLC enabled device 124 via the electrical power network 118, demodulates the received signal to generate the data signals, and transmits the demodulated data signals to the router 104.

The electrical power network 118 comprises the electrical power network of the house in which the socket 112 is mounted. That is, the electrical power network 118 is configured to transmit AC electric power that operates at a power-line frequency, e.g., to power various devices (e.g., electric lights, fans, microwave, oven, various wall mounted electrical sockets, etc.) of the house. The electrical power network 118 is also configured to transmit the modulated data signals to and from the PLC modules 116 and 124.

The router 104 is coupled to the PLC module 116 via an appropriate communication link configured to transmit data signals between the router 104 and the PLC module 116. For example, router 104 is coupled to the PLC module 116 via an Ethernet link, a USB link, a wireless communication link, or the like.

Although not illustrated in FIG. 1, the PLC module 116 also comprises various other components. For example, the PLC module 116 comprises a communication port (e.g., an Ethernet port) to communicate with the router 104, mechanical arrangement to couple the PLC module 116 in the socket 112, various display devices (e.g., light emitting diodes (LEDs)) for displaying various operational status of the PLC module 116 (e.g., as will be discussed herein later), and/or the like. In an embodiment, one or both of the PLC modules 116 and 124 are PLC modems.

The system 100 also comprises a socket 120 coupled to the electrical power network 118. The socket 120 comprises a PLC module 124 that is coupled to the electrical power network 118. In an embodiment, the socket 120 also comprises a wireless communication module 128. In an embodiment, the PLC module 124 operates at least in part in a manner similar to the PLC module 116. For example, the PLC module 124 receives AC power signals and modulated data signals (e.g., from the PLC module 116) over the electrical power network 118, filters out the AC power signals to obtain modulated data signals, demodulates the modulated data signals to generate the data signals, and transmits the data signals to a user device (e.g., to user device 134a via a wireless connection and/or to user device 134b via a wired connection) communicatively coupled to the socket 120. The PLC module 124 also receives data signals from the user devices 134a and/or 134b, modules the received data signals, and transmits the modulated signals over the electrical power network 118 (e.g., to the PLC module 116).

In an embodiment, the socket 120 further comprises the wireless communication module 128. The wireless communication module 128 wirelessly couples the PLC module 124 to one or more user devices, e.g., the user device 134a. In an embodiment, the wireless communication module 128 operates in accordance with the IEEE 802.11 family of standards. Thus, the user device 134a is communicatively coupled to the PLC module 124 over a wireless communication channel, via the wireless communication module 128. In an embodiment, the PLC module 124 is also coupled to the user device 134b via, for example, an Ethernet link.

As illustrated in FIG. 1 and in an embodiment, the socket 112 does not comprise a wireless communication module. For example, as the router 104 may be coupled to the socket 112 via an Ethernet link, the socket 112 may not need a wireless communication module, making the socket 112 cheaper than the socket 120. However, in another embodiment, the socket 112 comprises a wireless communication module (e.g., similar to the wireless communication module 128 of the socket 120). In such an embodiment, the socket 112 becomes identical to the socket 120, and the sockets 112 and 120 may be used interchangeably. For example, in such an embodiment and although not illustrated in FIG. 1, the socket 120 (e.g., instead of the socket 112) may be coupled to the router 104, and the socket 112 (e.g., instead of the socket 120) may be coupled to the user devices 134a and 134b.

Figure 2A:
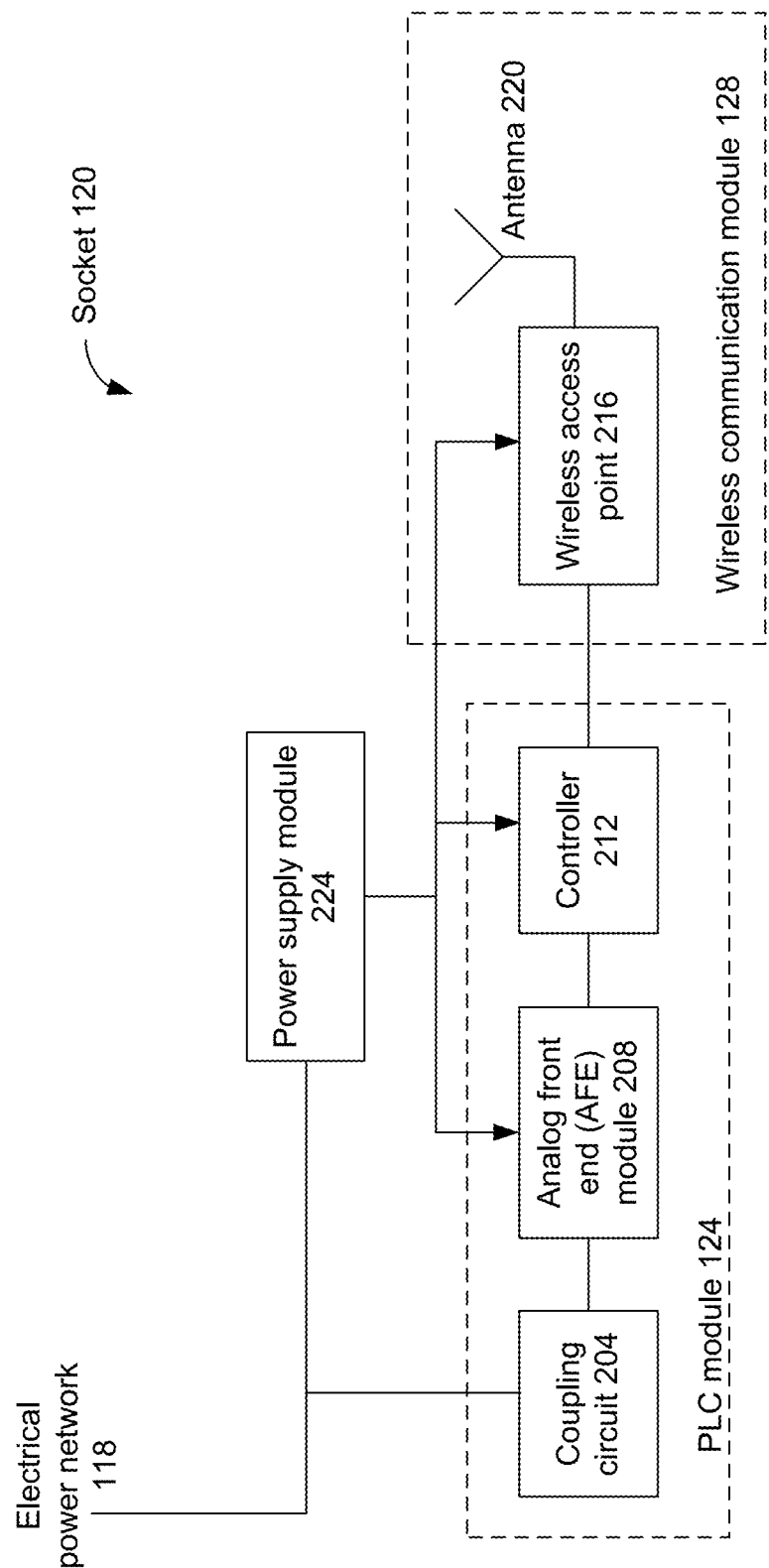
FIGS. 2A and 2B schematically illustrate example implementations of the wall mounted socket of FIG. 1.

FIG. 2A schematically illustrates an example implementation of the socket 120 of FIG. 1 in more detail. As illustrated in FIGS. 1 and 2A, the socket 120 is coupled to the electrical power network 118. As illustrated in FIG. 2A, the PLC module 124 (illustrated as dotted line in FIG. 2A) of the socket 120 comprises a coupling circuit 204 configured to couple the electrical power network 118 to various components of the PLC module 124. The PLC module 124 further comprises an analog front end (AFE) module 208 configured to be coupled to the electrical power network 118 via the coupling circuit 204. A controller 212 of the PLC module 124 is coupled to the AFE module 208.

The socket 120 further comprises the wireless communication module 128, which comprises a wireless access point 216 coupled to the controller 212, and an antenna 220 coupled to the wireless access point 216. The socket 120 further comprises a power supply module 224 configured to (i) receive power from the electrical power network 118, and (ii) supply power to various components of the socket 120, as illustrated in FIG. 2A.

In an embodiment, the coupling circuit 204 comprises, for example, one or more filters configured to filter out the AC signals from the modulated data signals received over the electrical power network 118. In an embodiment, the AFE module 208 amplifies the modulated signals received from the coupling circuit 204, and/or to be transmitted to the coupling circuit 204. The controller 212 is configured to demodulate the modulated data signals received from the coupling circuit 204 via the AFE module 208. Similarly, the controller 212 is also configured to modulate data signals, and transmit the modulated data signals over the electrical power network 118 via the AFE module 208 and the coupling circuit 204.

The controller 212 is configured to, for example, handle physical layer and/or media access control (MAC) layer associated with the data signals, and act as an interface between the PLC module 124 and the wireless communication module 128. For example, the controller 212 acts as a gateway for the wireless access point 216 to access the communication network 108. The wireless access point 216 wirelessly communicates signals (e.g., in accordance with the IEEE 802.11 family of standards) with one or more user devices (e.g., user device 134a of FIG. 1). In an embodiment, a service set identification (SSID) used by the wireless communication module 128 is same as the SSID used by the router 104 to wirelessly communicate with, for example, various user devices (e.g., user device 132). However, for example, one or more communication channels used by the wireless communication module 128 to communicate with various user devices (e.g., user device 134a) are different from those used by the router 104 to wirelessly communicate with various user devices (e.g., user device 132).

Figure 2B:
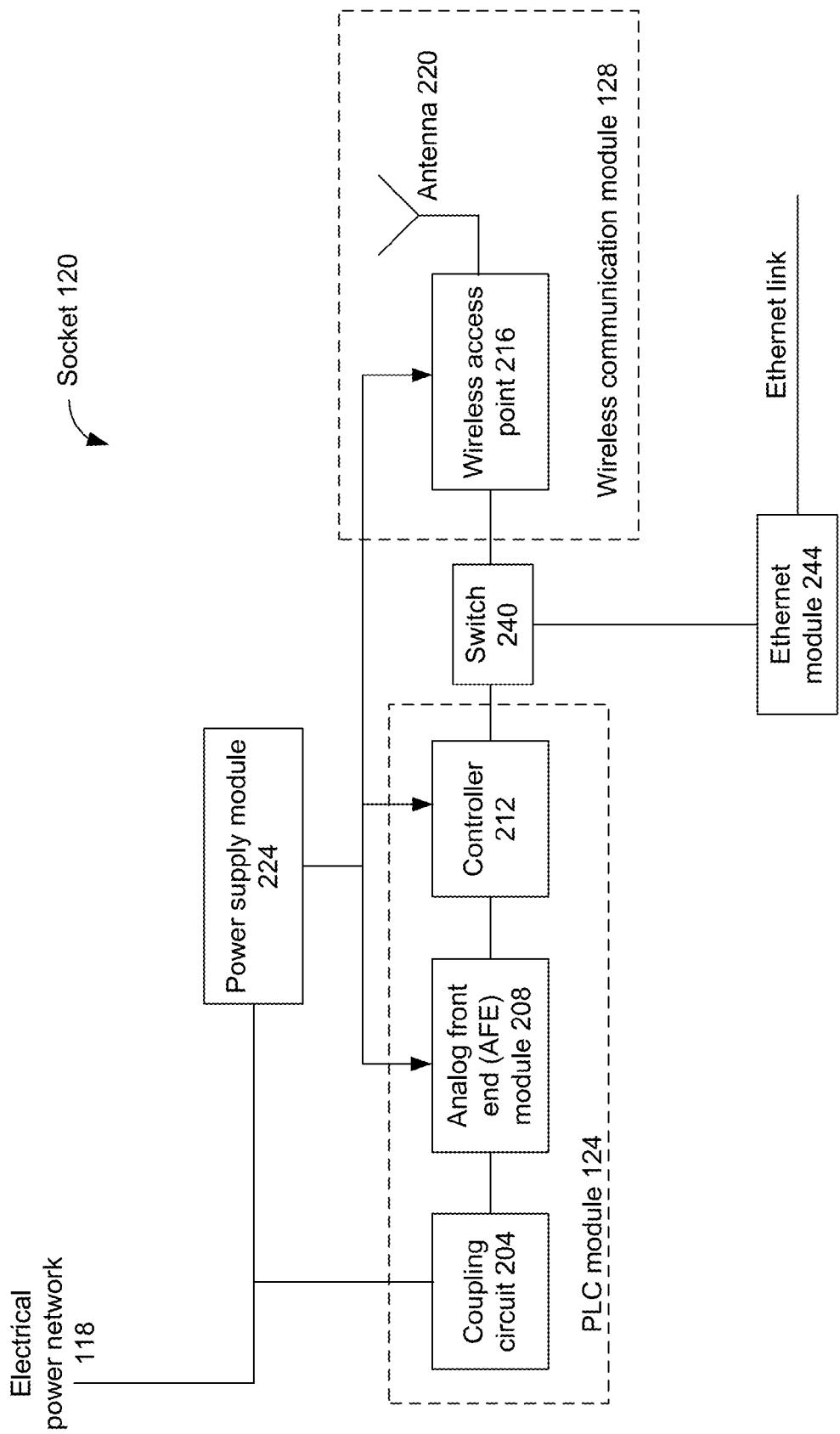

FIG. 2B schematically illustrates another example implementation of the socket 120 of FIG. 1 in more detail. Various components of FIG. 2B are similar to the corresponding components of FIG. 2A. However, in the embodiment of FIG. 2B, the socket 120 additionally comprises a switch 240 coupled between the controller 212 and the wireless access point 216. An Ethernet module 244 is coupled to the switch 240. In an embodiment, an interface between the switch 240 and the controller 212 comprises, for example, Media Independent Interface (MII), reduced Gigabit Media Independent Interface (RGMII), or the like. Similarly, in an embodiment, an interface between the switch 240 and the wireless access point 216, and/or an interface between the switch 240 and the Ethernet module 244 comprises, for example, MII, RGMII, or the like. In an embodiment, the Ethernet module 244 comprises an Ethernet transformer and/or an Ethernet port configured to provide Ethernet connectivity to the socket 120. For example, the Ethernet module 244 is used to couple the user device 134b to the PLC module 124 over an Ethernet link. In an embodiment, the switch 240 is configured to simultaneously connect the PLC module 124 to the wireless access point 216 and the Ethernet module 244.

Figure 3:
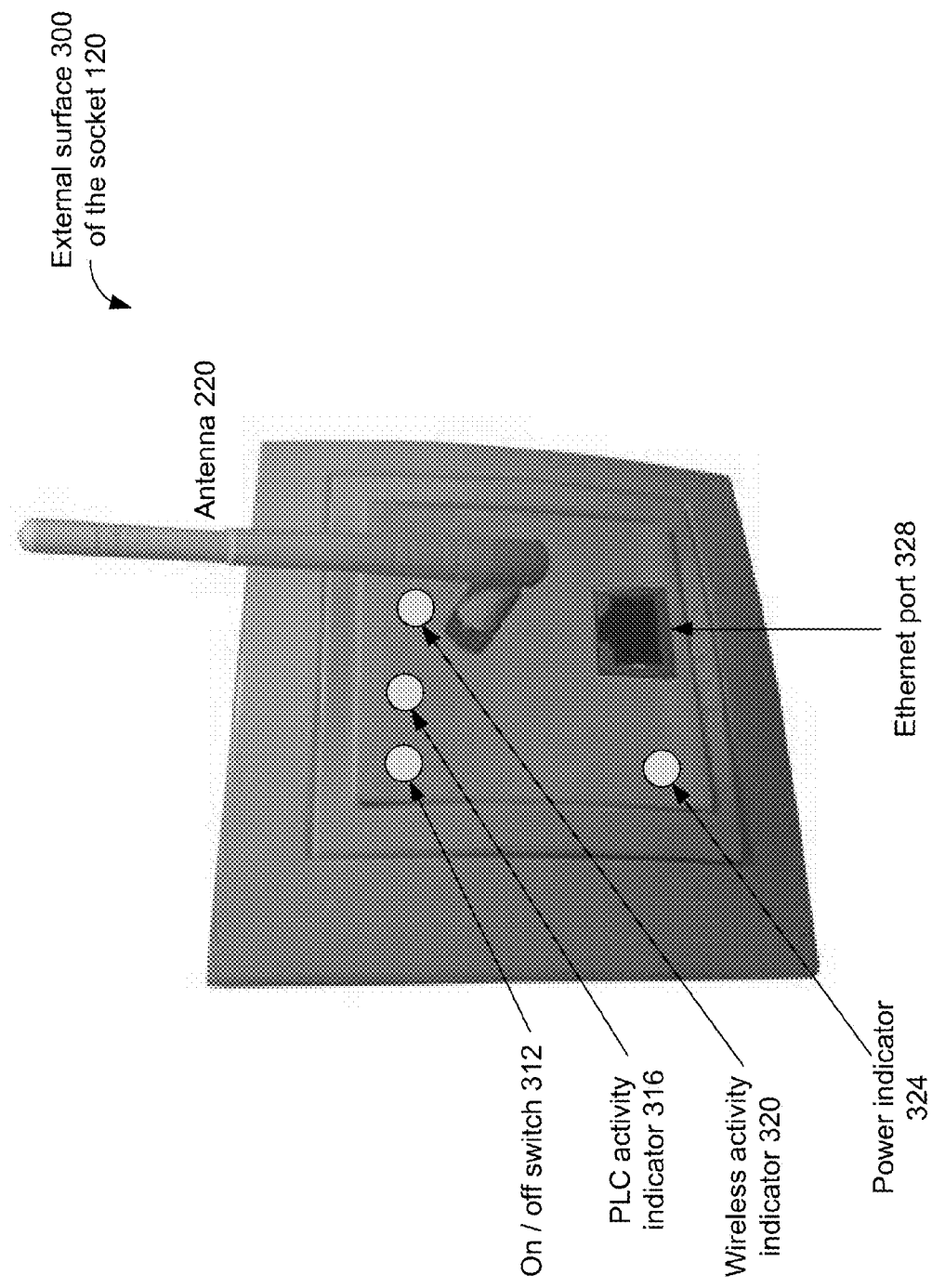
FIG. 3 illustrates an example implementation of an external surface of the wall mounted socket of FIG. 1.

FIG. 3 illustrates one implementation of an external surface 300 of the socket 120 of FIG. 1. The external surface 300 of the socket 120 is the surface of the socket that is outside the wall, while the PLC module 124, the wireless access point 216, the power supply module 224, and the Ethernet module 244 are included in a mechanical arrangement that is mounted or inserted inside the wall (e.g., once the socket 120 is mounted in the wall). The external surface 300 of the socket 120 comprises the antenna 220 of FIGS. 2A and 2B. The external surface 300 of the socket 120 also comprises an Ethernet port 328, which may be a part of the Ethernet module 224 of FIG. 2B.

The external surface 300 of the socket 120 further comprises an on/off switch 312 to turn on or off the socket 120. For example, while being turned off, various components of the socket 120 are powered off. The socket 120 also comprises various indicators (e.g., comprising respective light emitting diodes (LEDs)) for indicating various operating status of the socket 120. For example, the socket 120 comprises a PLC activity indicator 316 configured to indicate whether the PLC module 124 is active (e.g., processing data signals received from, and/or to be transmitted to the electrical power network 118). In another example, the socket 120 comprises a wireless activity indicator 320 configured to indicate whether the wireless communication module 128 is active (e.g., processing data signals received from, and/or to be transmitted to the electrical power network 118). In another example, the socket 120 comprises a power indicator 324 configured to indicate whether the socket 120 is on or off. The socket 120 may have various other indicators and/or switches. For example, in an embodiment and although not illustrated in FIG. 3, the socket 120 has a switch to turn off various indicators, such that the constant glowing of the indicators does not disturb any people residing in the room in which the socket 120 is mounted.

In an embodiment, various components of the socket 120 (e.g., the PLC module 124, the wireless access point 216, the switch 240, the Ethernet module 244, etc.) are arranged such that the socket 120 has a shape and size that is substantially similar to a shape and size of a typical household electrical socket (e.g., that provides regular AC power to various electrical appliances) that is normally mounted in a wall of a house. For example, to mount such a typical household electrical socket, the wall has a clearance of certain size. In an embodiment, the socket 120 may be sized that the socket fits in such a clearance. Accordingly, the socket 120 can safely replace any typical household electrical socket and be in accordance with any regulations and standards associated with household electrical sockets.

The sockets 112 and 120 enable increased network connectivity in the house in which these sockets are mounted. For example, a coverage area of the router 104 may not span the entirety of the house. For example, the coverage range of the router 104 may span less than the entirety of the house. However, the electrical power network 118 generally covers almost all the rooms of the house. Thus, using the sockets 112 and 120, a range of coverage area of the router 104 can be increased (e.g., to cover an entirety of the house). For example, while a coverage area of the router 104 may not span the entire house, a combined wireless coverage range of the router 104 and a wireless coverage range of the wireless communication module 128 may span the entire house. Thus, the coverage of the router 104 is in increased using the sockets 112 and 120. Furthermore, installing the sockets 112 and 120 in the house, for example, increases a value or a price of the house.

Referring back to FIG. 1, the system 100 illustrates only a single socket 120 coupled to the socket 112. However, in another embodiment, multiple sockets (e.g., each having a corresponding PLC module and possibly having a wireless communication module 128) may be coupled to the socket 112 over the electrical power network 118, thereby further increasing the range of the router 104. For example, each room in the house (or rooms at various regions of the house) may have sockets that are similar to the socket 120, which can be used to selectively increase the coverage of the router 104.

Figure 4A:
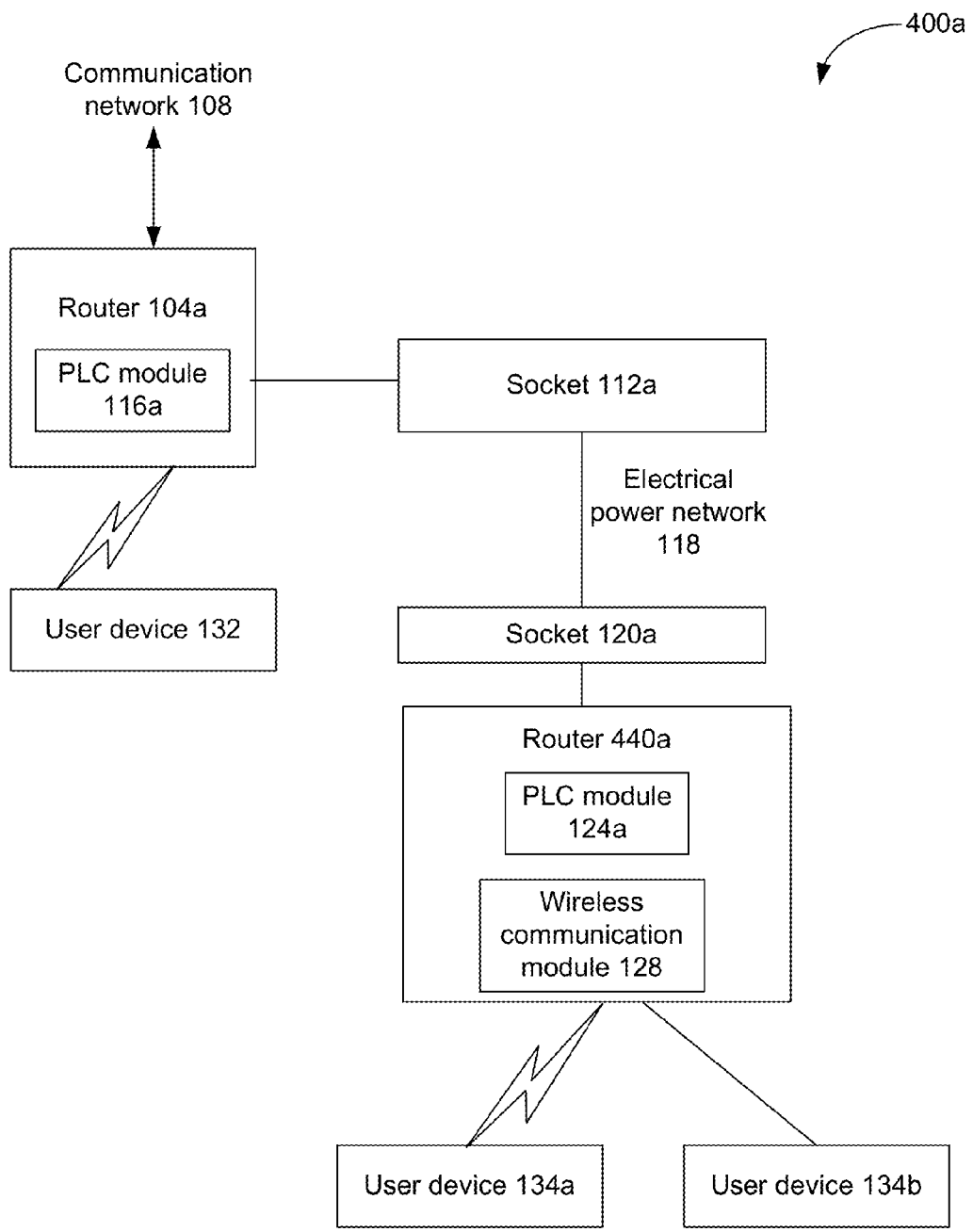
FIG. 4A schematically illustrates one implementation of a system, including a wall mounted socket, for increasing network connectivity through power line communications.

FIG. 1 illustrates the sockets 112 and 120 comprising the respective PLC modules, and the socket 120 comprising the wireless communication module 128. However, in an embodiment, one or both the sockets 112 and 120 may not include the respective PLC modules (i.e., the PLC modules may be external to the sockets). For example, FIG. 4A illustrates a system 400a comprising a router 104a including a PLC module 116a. The router 104a is coupled to a socket 112a, which is a regular household electrical socket that is coupled to the electrical power network 118. Another socket 120a is also coupled to the electrical power network 118. Another router 440a is coupled to the electrical power network 118 through the socket 120a. The router 440a comprises a PLC module 124a and the wireless communication module 128. In an embodiment, the sockets 112a and 120a are regular household electrical sockets having plug points designed for household electrical devices. That is, the system 400a may be implemented without any change to the existing household electrical sockets of the house. The router 104a is coupled to the socket 112a using a wire that has 2 pin, or 3 pin power plug connection at one end (i.e., the end that is inserted in the socket 112a). Similarly, the router 440a is coupled to the socket 120a using a wire that has 2 pin, or 3 pin plugs at one end (i.e., the end that is inserted in the socket 120a). The operations of various components of FIG. 4A (e.g., the PLC modules 116a and 124a) are similar to the corresponding components of FIG. 1 (e.g., similar to the corresponding PLC modules of FIG. 1). Accordingly, a more detailed description of the PLC modules 116a and 124a and various other components of the system 400a are not provided herein.

Figure 4B:
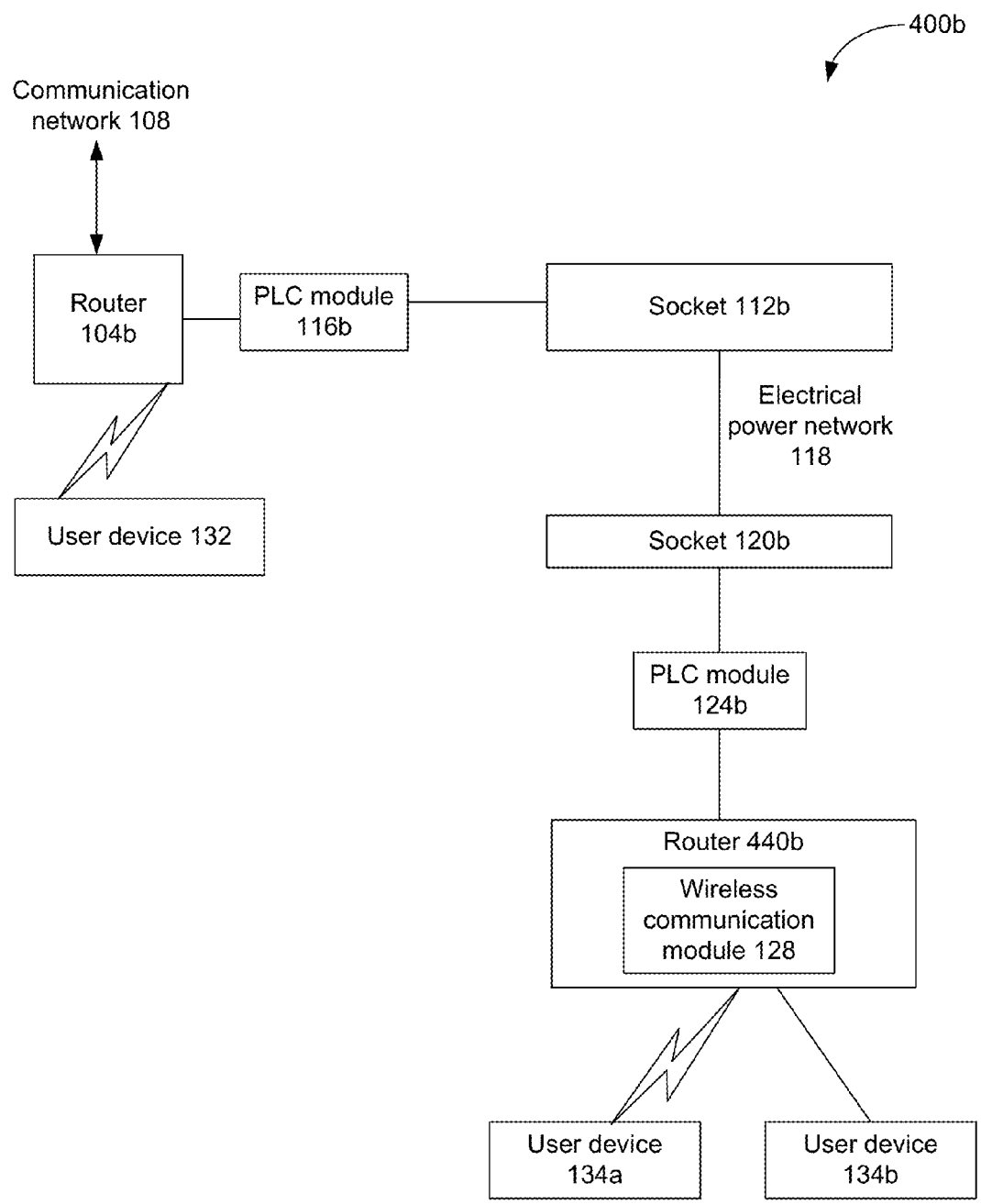
FIG. 4B schematically illustrates one implementation of a system, including a wall mounted socket, for increasing network connectivity through power line communications.

FIG. 4B schematically illustrates a system 400b for increasing network connectivity through power line communications and wall mounted sockets. The system 400b of FIG. 4B is at least in part similar to the systems 100 and 400a. However, unlike systems 100 and 400a, in the system 400b of FIG. 4B, the PLC modules 116b and 124b are external to the corresponding routers and the corresponding sockets. For example, the PLC module 116b is a stand-alone PLC module coupled to the router 104b and socket 112b. In an embodiment, the PLC module 116b is coupled to (i) the router 104b using, for example, an Ethernet link, and (ii) the socket 112b using, for example, an AC power cable. Similarly, the PLC module 124b is a stand-alone PLC module coupled to a router 440b (e.g., which may be a wireless Access Point) and socket 124b. In an embodiment, the PLC module 124b is coupled to (i) the router 440b using, for example, an Ethernet link, and (ii) the socket 120b using, for example, an AC power cable. As the PLC modules in FIG. 4B are external to the corresponding routers and sockets, in the embodiment of FIG. 4B, regular household electrical sockets and regular routers can be used. The operations of various components of FIG. 4B are similar to the corresponding components of FIGS. 1 and 4A. Accordingly, a more detailed description of the various components of the system 400b is not provided herein.

Figure 5:
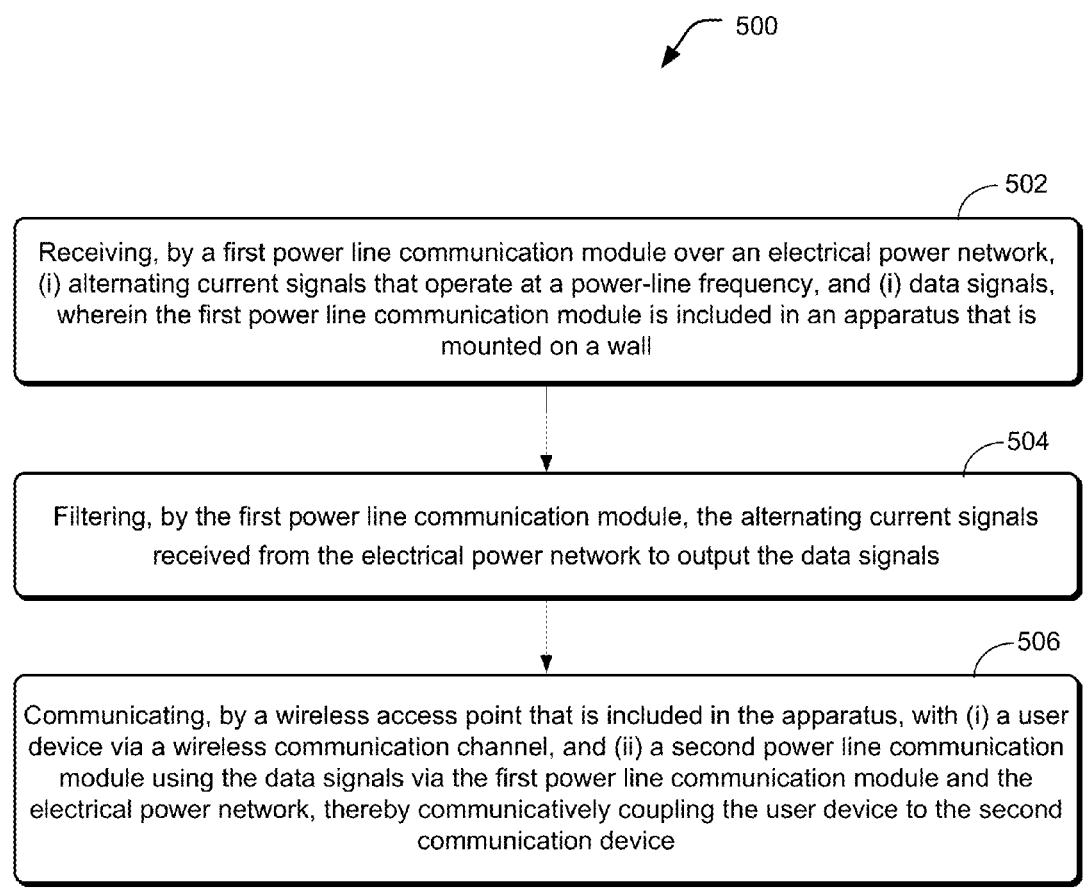
FIG. 5 illustrates an example method for operating a system for increasing network connectivity through power line communications.

FIG. 5 illustrates an example method 500 for operating a system (e.g., one or more of systems 100, 400a and 400b) for increasing network connectivity through power line communications. At 502, a first power line communication module (e.g., the power line communication module 124) receives, over an electrical power network (e.g., electrical power network 118), (i) alternating current signal that operates at a power-line frequency, and (i) data signals, wherein the first power line communication module is included in an apparatus (e.g., socket 120) that is mounted on a wall. At 504, the first power line communication module filters the alternating current signals received from the electrical power network to output the data signals. At 506, a wireless access point (e.g., the wireless access point 216), which is included the apparatus, communicates with (i) a user device (e.g., user device 134a) via a wireless communication channel, and (ii) a second power line communication module (e.g., power line communication module 116 of the socket 112) using the data signals via the first power line communication module and the electrical power network, thereby communicatively coupling the user device to the second communication device.

In accordance with various embodiments, an article of manufacture may be provided that includes a storage medium having instructions stored thereon that, if executed, result in the operations described herein with respect to the method 500 of FIG. 5 (and/or various other operations discussed in the present disclosure). In an embodiment, the storage medium comprises some type of non-transitory memory. In accordance with various embodiments, the article of manufacture may be a computer-readable medium such as, for example, software or firmware.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. An apparatus comprising:
    a first power line communication module coupled to an electrical power network, wherein the electrical power network is configured to transmit (i) power using alternating current signals that operate at a power-line frequency, and (i) data signals, wherein the first power line communication module is configured to (i) filter the alternating current signals received from the electrical power network, and (ii) output the data signals; and
    a wireless access point coupled to the first power line communication module, wherein the wireless access point is configured to (i) communicate with a user device via a wireless communication channel, and (ii) communicate, using the data signals via the first power line communication module and the electrical power network, to a second power line communication module coupled to the electrical power network, thereby communicatively coupling the user device to the second power line communication module,
    wherein the apparatus is configured to be mounted on a wall.

2. The apparatus of claim 1, wherein the apparatus is a wall mounted socket.

3. The apparatus of claim 1, wherein the user device is a first user device, and wherein the apparatus further comprises:

an Ethernet port, wherein the apparatus is configured to be communicatively coupled to a second user device via an Ethernet link through the Ethernet port.

4. The apparatus of claim 3, further comprising:

a switch configured to enable the apparatus to communicate with (i) the first user device via the wireless communication channel, and (ii) the second user device through the Ethernet port.

5. The apparatus of claim 1, further comprising:

an antenna coupled to the wireless access point, wherein the antenna is configured to communicate data signals with the user device via the wireless communication channel.

6. The apparatus of claim 1, further comprising:

a power supply module configured to
receive power from the electrical power network, and supply power to each of (i) the first power line communication module, and (ii) the wireless access point.

7. The apparatus of claim 1, wherein the first power line communication module is further configured to:

receive data signals from the user device via the wireless access point;

modulate the data signals received from the user device; and transmit the modulated data signal over the electrical power network to the second power line communication module.

8. The apparatus of claim 1, wherein the first power line communication module comprises:

a coupling circuit configured to (i) filter the alternating current signals received from the electrical power network, and (ii) output the data signals; and a controller configured to control one or both of a physical layer and media access control (MAC) layer associated with the data signals.

9. The apparatus of claim 1, further comprising:

a switch to disable each of (i) the first power line communication module, and (ii) the wireless access point; and one or more indicators indicating corresponding one or more operational statuses of the apparatus.

10. The apparatus of claim 1, wherein:

the second power line communication module is coupled to a communication device; and the communication device is an access point that is communicatively coupled to a communication network.

11. A method comprising:

receiving, by a first power line communication module over an electrical power network, (i) alternating current signals that operate at a power-line frequency, and (i) data signals, wherein the first power line communication module is included in an apparatus that is mounted on a wall;

filtering, by the first power line communication module, the alternating current signals received from the electrical power network to output the data signals; and communicating, by a wireless access point that is included in the apparatus, with (i) a user device via a wireless communication channel, and (ii) a second power line communication module using the data signals via the first power line communication module and the electrical power network, thereby communicatively coupling the user device to the second power line communication module, wherein the second power line communication module is coupled to the electrical power network.

12. The method of claim 11, wherein the apparatus is a wall mounted socket.

13. The method of claim 11, wherein the user device is a first user device, and wherein the method further comprises:

communicating, by the apparatus via an Ethernet port included in the apparatus, with a second user device using an Ethernet link.

14. The method of claim 13, further comprising:

communicating, using a switch included in the apparatus, with (i) the first user device via the wireless communication channel, and (ii) the second user device through the Ethernet port.

15. The method of claim 11, further comprising:

communicating, using an antenna coupled to the wireless access point, with the user device via the wireless communication channel.

16. The method of claim 11, further comprising:

powering, by a power supply module using power received from the electrical power network, each of (i) the first power line communication module, and (ii) the wireless access point.

17. The method of claim 11, further comprising:

receiving data signals from the user device via the wireless access point;

modulating the data signals received from the user device; and transmitting the modulated data signal over the electrical power network to the second power line communication module.

18. The method of claim 11, further comprising:

controlling, using a controller, one or both of a physical layer and media access control (MAC) layer associated with the data signals.

19. The method of claim 11, further comprising:

providing, in the apparatus, a switch to disable each of (i) the first power line communication module, and (ii) the wireless access point, and one or more indicators indicating corresponding one or more operational statuses of the apparatus.

20. The method of claim 1, wherein:

the second power line communication module is coupled to a communication device; and the communication device is an access point that is communicatively coupled to a communication network.

* * * * *